(12) United States Patent
Yin et al.

(10) Patent No.: US 11,049,324 B2
(45) Date of Patent: Jun. 29, 2021

(54) METHOD OF DISPLAYING VIRTUAL CONTENT BASED ON MARKERS

(71) Applicant: GUANGDONG VIRTUAL REALITY TECHNOLOGY CO., LTD., Guangzhou (CN)

(72) Inventors: Yuanqing Yin, Guangzhou (CN); Guoxing Yu, Guangzhou (CN); Yifu Qiao, Guangzhou (CN); Jingwen Dai, Guangzhou (CN); Jie He, Guangzhou (CN)

(73) Assignee: GUANGDONG VIRTUAL REALITY TECHNOLOGY CO., LTD., Guangzhou (CN)

( * ) Notice: Subject to any disclaimer, the term of this patent is extended or adjusted under 35 U.S.C. 154(b) by 0 days.

(21) Appl. No.: 16/666,429

(22) Filed: Oct. 29, 2019

(65) Prior Publication Data

US 2020/0066054 A1  Feb. 27, 2020

Related U.S. Application Data

(63) Continuation of application No. PCT/CN2019/097128, filed on Jul. 22, 2019.

(30) Foreign Application Priority Data

Jul. 23, 2018 (CN) .......................... 201810814635.3
Aug. 10, 2018 (CN) .......................... 201810910950.6
Aug. 14, 2018 (CN) .......................... 201810924523.3

(51) Int. Cl.
*G06T 19/00* (2011.01)
*G06T 7/70* (2017.01)
(Continued)

(52) U.S. Cl.
CPC .......... *G06T 19/006* (2013.01); *G02B 27/017* (2013.01); *G06F 3/011* (2013.01);
(Continued)

(58) Field of Classification Search
CPC ......... G06T 19/006; G06T 7/70; G06T 19/20; G02B 27/017; G02B 2027/014;
(Continued)

(56) References Cited

U.S. PATENT DOCUMENTS

| 2013/0141461 A1* | 6/2013 | Salter ................. G06K 9/00671 345/633 |
| 2016/0196692 A1* | 7/2016 | Kjallstrom .......... G06F 3/04815 345/633 |

(Continued)

FOREIGN PATENT DOCUMENTS

| CN | 105931272 A | 9/2016 |
| CN | 106875493 A | 6/2017 |
| JP | 2002159019 A | 5/2002 |

OTHER PUBLICATIONS

Fyyufenfei Artoolkit Source code learning note 1: Simpelite.c ,CSDN is from http://www.arjishu.com/forumphp?mod=viewthread&tid5221 Mar. 15, 2017(Mar. 15, 2017), p. 1, line 2 to p. 3, line 14.

(Continued)

*Primary Examiner* — Chong Wu

(57) ABSTRACT

A method of generating a virtual object includes: capturing an image containing a target marker, wherein the target marker is at least one marker of a plurality of markers, and is within a visual range of the terminal device, and the plurality of markers are arranged at various positions dispersively; acquiring a target spatial position of the target marker relative to the terminal device, based on the image; reading a first spatial position relation between each of the plurality of markers, storing the same in the terminal device, and acquiring a second spatial position relation of a virtual (Continued)

object relative to the plurality of markers; determining a display position of the virtual object, based on the first spatial position relation, the second spatial position relation, and the target spatial position; and generating the virtual object based on the display position.

20 Claims, 7 Drawing Sheets

(51) Int. Cl.
*G02B 27/01* (2006.01)
*G06F 3/01* (2006.01)
*G06F 3/0481* (2013.01)
*G06K 9/00* (2006.01)
*G06T 19/20* (2011.01)

(52) U.S. Cl.
CPC .......... *G06F 3/017* (2013.01); *G06F 3/04815* (2013.01); *G06K 9/00671* (2013.01); *G06T 7/70* (2017.01); *G06T 19/20* (2013.01); *G02B 2027/014* (2013.01)

(58) Field of Classification Search
CPC ...... G06F 3/011; G06F 3/017; G06F 3/04815; G06K 9/00671
See application file for complete search history.

(56) References Cited

U.S. PATENT DOCUMENTS

2017/0295360 A1* 10/2017 Fu ..................... G02B 27/0172
2018/0011317 A1* 1/2018 Hasegawa ............. G16H 30/40

OTHER PUBLICATIONS

Huhang zhar Analysis of multiple identification ar routines (2) ,CSDN is from https://blog.csdnnet/chuhangzhqr/article/details/ 49889115 Nov. 17, 2015 (Nov. 17, 2015), p. 1, line 1 to p. 3, p. 2

* cited by examiner

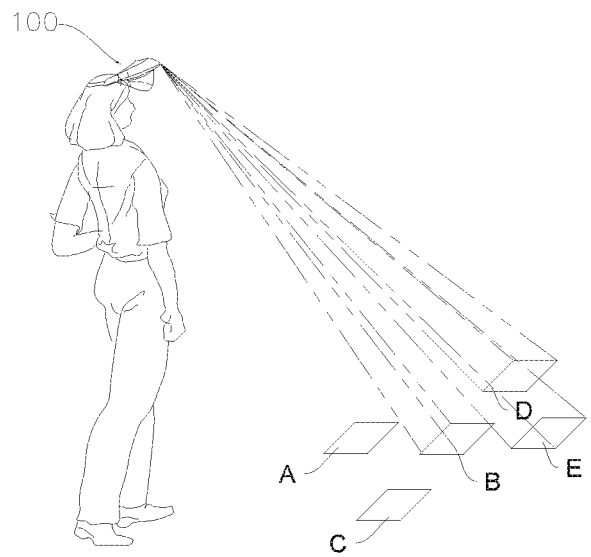

FIG. 7b

Based on the first spatial position relation, acquiring a central position of a region defined by the plurality of marked objects — S851

Based on the central position, acquiring a predefined marked object from the plurality of marked objects, wherein a distance between the predefined marked object and the central position is less than that between any other marked object and the central position — S852

Based on the target spatial position, the second spatial position relation, and the spatial position relation of the predefined marked object with respect to the target marked object, determining the display position of the virtual object — S853

FIG. 8

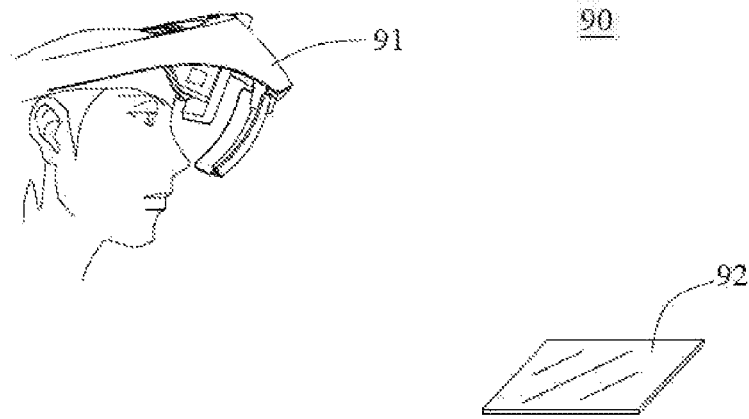

FIG. 9a

METHOD OF DISPLAYING VIRTUAL CONTENT BASED ON MARKERS

CROSS REFERENCE TO RELATED APPLICATIONS

The present application is a continuation-application of International (PCT) Patent Application No. PCT/CN2019/097128 filed on Jul. 22, 2019, which claims foreign priorities of Chinese Patent Application No. 201810814635.3, filed on Jul. 23, 2018, Chinese Patent Application No. 201810910950.6, filed on Aug. 10, 2018, and Chinese Patent Application No. 201810924523.3, filed on Aug. 14, 2018, the entire contents of which are hereby incorporated by reference.

TECHNICAL FIELD

The present disclosure generally relates to the technical field of augmented reality, and in particular to a method of displaying virtual content, a terminal device, and a non-transitory storage medium.

BACKGROUND

In recent years, as technology advances, augmented reality (AR), virtual reality (VR), and other technologies have become a research hotspot gradually all over the world. Taking augmented reality as an example, the augmented reality is a technology to augment a user's perception of a real world by providing information generated from a computer system to the user. A content object generated by a computer, such as a virtual object, a virtual scene, a systemic message, or the like may be superimposed onto a real scene, in order to augment and modify an environment of real world, or augment or modify the perception of data indicating the environment of real world.

In most cases, when using a terminal device to display the virtual content, the terminal device may use a camera to capture an image of a marker, recognize the image, and display the virtual content based on a recognition result of the marker. However, recognition and tracking of the marker may be impacted by a visual range of the camera, such that the terminal device may lost the tracking of the marker easily, impacting the display of the terminal device.

SUMMARY OF THE DISCLOSURE

According to embodiments of the present disclosure, a method of generating virtual content, a terminal device, and a storage medium may be provided to enhance stability of a display function of the terminal device.

According to a first aspect, an embodiment of the present disclosure may provide a method of generating virtual content adapted to a terminal device. The method may include: capturing an image which includes a target marker, wherein the target marker may be at least one of a plurality of markers, the at least one of the plurality of markers is located within a visual range of the terminal device, and the plurality of markers may be arranged at various positions spaced apart from each other; acquiring a target spatial position of the target marker relative to the terminal device based on the image; reading a stored first spatial position relation between each of the plurality of markers and acquiring a second spatial position relation of a virtual object relative to the plurality of markers; determining a display position of the virtual object based on the first spatial position relation, the second spatial position relation, and the target spatial position; and generating the virtual object based on the display position.

According to a second aspect, an embodiment of the present disclosure may provide a method of updating data. The method may include: capturing an image to comprise a marker; recognizing the marker in the image, and determining an identity of the marker; acquiring an instruction of updating bound data corresponding to the marker based on the identity; replacing first data binding with the marker with second data based on the instruction of updating bound data; and generating a virtual image corresponding to the second data.

According to a third aspect, an embodiment of the present disclosure may provide a method of image capture applied to a terminal device. The method may include: acquiring pose of the terminal device; generating a control instruction for capturing based on the pose, and sending the control instruction for capturing to an camera arranged on a carrier, wherein the control instruction for capturing is configured to instruct the camera to capture an image of a scene surrounding the carrier from an orientation and an angle matching with the pose; and receiving the image of the scene captured by the camera, and generating display content based on the image of the scene.

According to a fourth aspect, an embodiment of the present disclosure may provide a terminal device. The terminal device may include a non-transitory memory and a processor. The non-transitory memory may have a computer program stored therein. When the computer program is executed by the processor, the processor may perform the above-mentioned method.

According to a fifth aspect, an embodiment of the present disclosure may provide a computer storage medium, and a computer program is stored therein. When the computer program is executed by the processor, the processor may perform the above-mentioned method.

Details of one or more embodiments of the present disclosure may be provided in following figures and descriptions. Other features, purposes, and advantages of the present disclosure may become obvious from the specification, figures, and claims.

BRIEF DESCRIPTION OF THE DRAWINGS

FIGS. 7a-7b are scenes of an alternative of another implementation according to an embodiment of the present disclosure.

FIG. 8 is diagram showing determination of a position of a virtual object to be displayed according to an embodiment.

FIGS. 9a and 9b illustrate another system of augmenting reality according to the present disclosure.

DETAILED DESCRIPTION

In order to allow skilled in the related art to understand the solution of the present disclosure better, technical solutions of embodiments of the present disclosure will be clearly described in full details by referring to drawings of the embodiments of the present disclosure.

Figure 1:
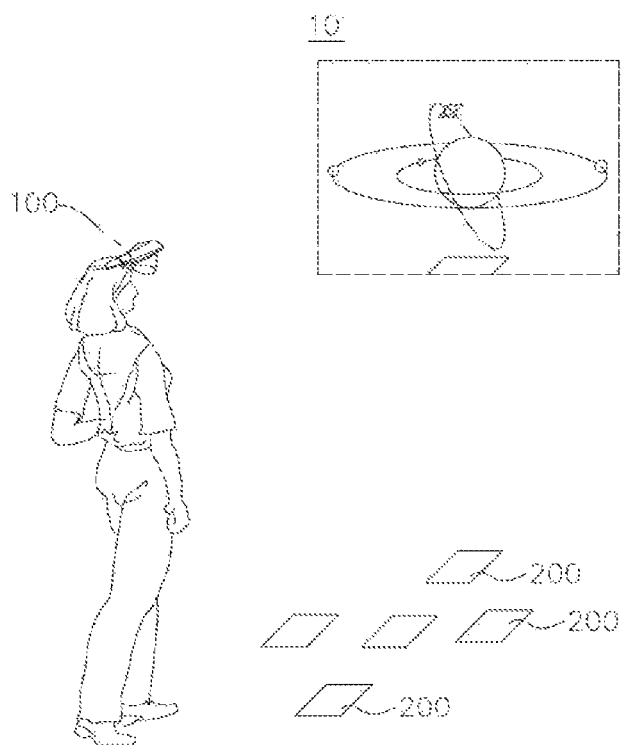
FIG. 1 is a scene of performing augmented reality according to an embodiment of the present disclosure.

As shown in FIG. 1, an embodiment of the present disclosure may provide an augmented reality system 10, including a terminal device 100 and a plurality of markers 200. The plurality of markers 200 may be arranged at various positions in the scene with distance apart from each other. For example, the plurality of markers 200 may be arranged on a surface of a desk with distance apart from each other, or in a region of the ground with distance apart from each other. The way of arranging the plurality of markers may not be limited herein. The terminal device 100 may be a head mounted display, a mobile phone, a tablet or other mobile devices. When the terminal device 100 is a head mounted display, the head mounted display may be an integrated head mounted display. The terminal device 100 may also be a head mounted display connected with an exterior electronic apparatus. The terminal device 100 may further be a smart terminal, such as a mobile phone, exteriorly connected to or plugged into a head mounted display, that is the terminal device 100 may be a processor device or a storage device of the head mounted display, and may be plugged into or connected to the head mounted display exteriorly, such that the head mounted display may display the virtual object.

Figure 2:
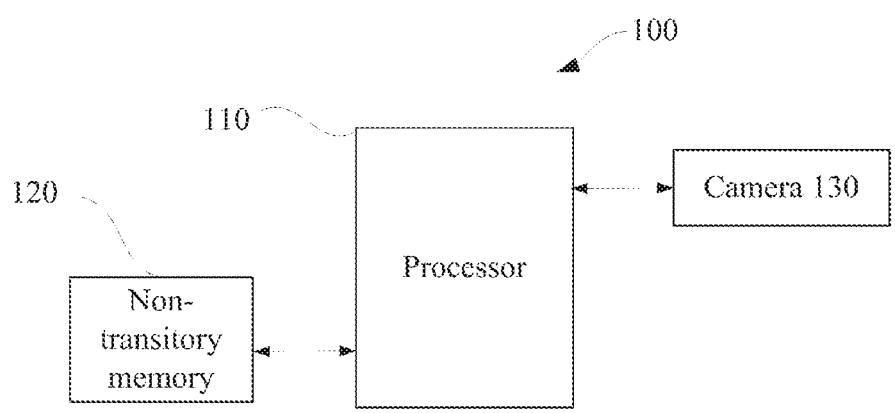
FIG. 2 is a diagram of a terminal device according to an embodiment of the present disclosure.

As shown in FIG. 2, in one embodiment, the terminal device 100 may be a head mounted display, including a processor 110, a non-transitory memory 120, and one or more programs. The one or more programs may be stored in the non-transitory memory 120 and may be executed by one or more processors 110. The one or more programs may be executed to perform a method as described in the present disclosure.

The processor 110 may include one or more processing cores. The processor 110 may use various interfaces and lines to connect various portions in the electronic device 100. By running or executing an instruction, a program, a code set, or an instruction set which may be stored in the non-transitory memory 120, and by invoking data stored in the non-transitory memory 120, various kinds of functions of the electronic device 100 may be performed, and data may be processed. The processor 110 may be realized in at least one form of hardware including a digital signal processor (DSP), a field-programmable gate array (FPGA), and a programmable gate array (PLA). The processor 110 may integrate at least one of a central processing unit (CPU), a graphics processing unit (GPU), a modem, and the like, or a combination thereof. The CPU may substantially handle an operating system, a user interface, applications, and the like. The GPU may be arranged to render and draw display content. The modem may be arranged to handle with wireless communication. The modem may be realized in a form of a communication chip independently, instead of being integrated into the processor 110.

The non-transitory memory 120 may include a random access memory or a read-only memory. The non-transitory memory 120 may be configured to store an instruction, a program, a code, a code set, or an instruction set. The non-transitory memory 120 may include a program storage area and a data storage area. The program storage area may store an instruction to implement an operating system, an instruction to perform at least one function (such as a touch, an audio display function, an image display function, and the like), an instruction to perform various methods as described in embodiments hereafter, and the like. The data storage area may store data generated during usage of the terminal device 100.

In some embodiments, the terminal device 100 may include a camera 130, configured to capture an image of a real object and a scene image of a target scene. The camera 130 may be an infrared camera or a visible-light camera. A specific type of the camera may not be limited.

In an embodiment, the terminal device may include one or more of the following components: a display module, an optical module, a communication module, and a power. The display module may include a display control unit. The display control unit may be configured to receive a displayed image of virtual content rendered by a processor, and the displayed image may be displayed and projected to the optical module, such that a user may see the virtual content through the optical module. The display module may be a display screen, a projection apparatus, or the like which are configured to display images. The optical module may use an off-axis optical system or a waveguide optical system, and the displayed image displayed by the display module may be projected to eyes of the user through the optical module. In some implementations, the user may observe a real environment through optical module, having a visual effect of the virtual content superimposed onto the real environment. The communication module may be a bluetooth, Wireless Fidelity (Wi-Fi), ZigBee, or other modules. The terminal device may communicate with and connect to an interactive device through the communication module to perform interaction of messages and instructions. The power may supply power to the entire terminal device, ensuring that all components of the terminal device may operate normally.

When any one or more of the plurality of markers 200 are within a visual range of the camera 130 of the terminal device 100, the camera 130 may capture an image containing one of the markers within the visual range. The terminal device 100 may recognize the image, acquire a spatial position of the marker contained in the image, such as position and orientation of the marker relative to the terminal device, and acquire a recognition result of the marker, such as an identity of the marker. The terminal device may display a virtual object based on the acquired spatial position of the marker relative to the terminal device and a spatial position relation between each of the plurality of markers 200. In some embodiments, a marker 200 may include a topological pattern, topology may refer to a connective relation between a sub-marker and a feature of the marker. The marker may not be limited, as long as the object is able to be tracked by the terminal device.

Figure 3:
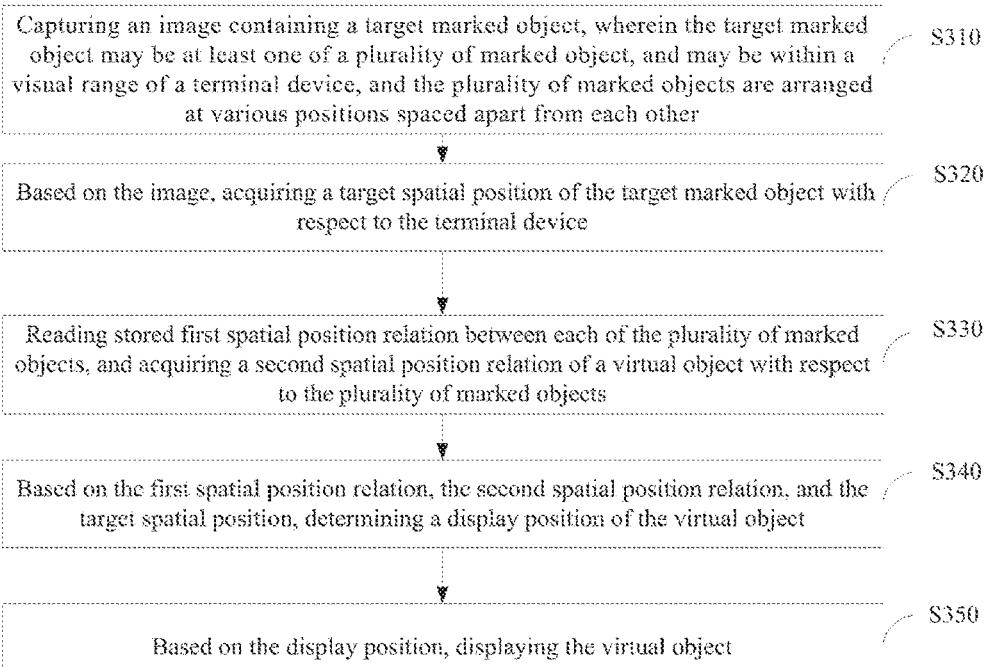
FIG. 3 is a diagram showing a method of displaying virtual content according to an embodiment of the present disclosure.

As shown in FIG. 3, an embodiment of the present disclosure may provide a method of displaying virtual content, which may be performed by a terminal device 100. The method may include following blocks.

At block S310, an image containing a target marker may be captured. The target marker may be at least one marker of a plurality of markers, and may be within a visual range of a camera. The plurality of markers may be arranged at various positions spaced apart from each other.

The plurality of markers may be arranged at various positions of a real scene with distance apart from each other. A position of each of the plurality of markers may be fixed or varying constantly according to requirements. The camera may capture an image of at least one marker located within the visual range.

At block S320, a target spatial position of the target marker relative to the terminal device based on the image.

The terminal device may recognize the marker contained in the captured image to acquire the target spatial position of the target marker relative to the terminal device and an identity of the marker. The target spatial position may include position and pose. The pose may be an orientation and a rotation angle of the target marker relative to the terminal device. Different markers may correspond to different identities.

At block S330, a stored first spatial position relation between each of the plurality of markers may be read, and a second spatial position relation of a virtual object relative to the plurality of markers may be acquired.

The terminal device may use the camera to capture one or more images in advance. The one or more images may include each of the plurality of markers located at various positions with distance apart from each other. Each of the plurality of markers may be recognized based on the one or more images, and a relative spatial position relation between each of the plurality of markers may be established and stored in the terminal device.

In some embodiments, positions of the plurality of markers may be relatively fixed. The terminal device may need to acquire the relative spatial position relation between each of the plurality of markers for only once, and store the relative spatial position relation into the non-transitory memory. The relative spatial position relation between each of the plurality of markers may not be acquired repeatedly. For example, in an augmented reality museum, various markers may be fixedly arranged at various positions, the positions of the markers may be stored in the terminal device in advance. When a user is wearing a terminal device in the museum, an image of any one of the markers may be captured by the terminal device, and position and pose of the other markers relative to the terminal device may be acquired based on the relative spatial position relation between the various markers which is stored in advance, and corresponding virtual objects may be displayed.

The terminal device may acquire a spatial position relation of a virtual object relative to the plurality of markers. The spatial position relation may be set according to an actual demand. For example, the virtual object may be positioned at a central position of a region defined by the plurality of markers, or positioned at which one of the plurality of markers is located. The position of the virtual object is not limited herein. The spatial position relation of a position at which the virtual object is to be displayed relative to the plurality of markers may be stored in the terminal device in advance, or may be selected by a user at real time.

At block S340, a display position of the virtual object may be determined based on the first spatial position relation, the second spatial position relation, and the target spatial position.

The terminal device may determine a position relation of the virtual object relative to the target marker based on the spatial position relation of the virtual object relative to the plurality of markers and the relative spatial position relation between each of the plurality of markers. Further, based on the target spatial position of the target marker relative to the terminal device, the target marker may be used as a reference, a spatial position of the virtual object relative to the terminal device may be acquired. The terminal device may perform coordinate transformation of the spatial position of the virtual object relative to the terminal device to obtain rendered coordinates of the virtual object in a virtual space of the terminal device. The rendered coordinates may be taken as a display position of the virtual object.

At block S350, the virtual object may be displayed based on the display position.

The terminal device may acquire data of the virtual object, and render the virtual object at the corresponding rendered coordinate based on the data of the virtual object, such that a virtual image may be generated, and the virtual object may be displayed. The data of the virtual object may be model data of the virtual object. The user may observe, via the terminal device, the virtual object superimposed on the real scene.

According to the method provided in the above-mentioned embodiments, a plurality of different markers may be arranged at various positions with distance apart from each other. The terminal device may recognize any one of the markers to determine positions of other markers which are located out of a visual range, and acquire a display position of the virtual object. Recognition and tracking of markers in a wide range may be achieved, and stability of the terminal device to display the virtual object may be improved. According to the method, it may be unnecessary for all the markers to be located within the visual range, the display position of the virtual object may still be acquired accurately. The method may solve the problem of a range limitation for recognizing and tracking markers.

Figure 4:
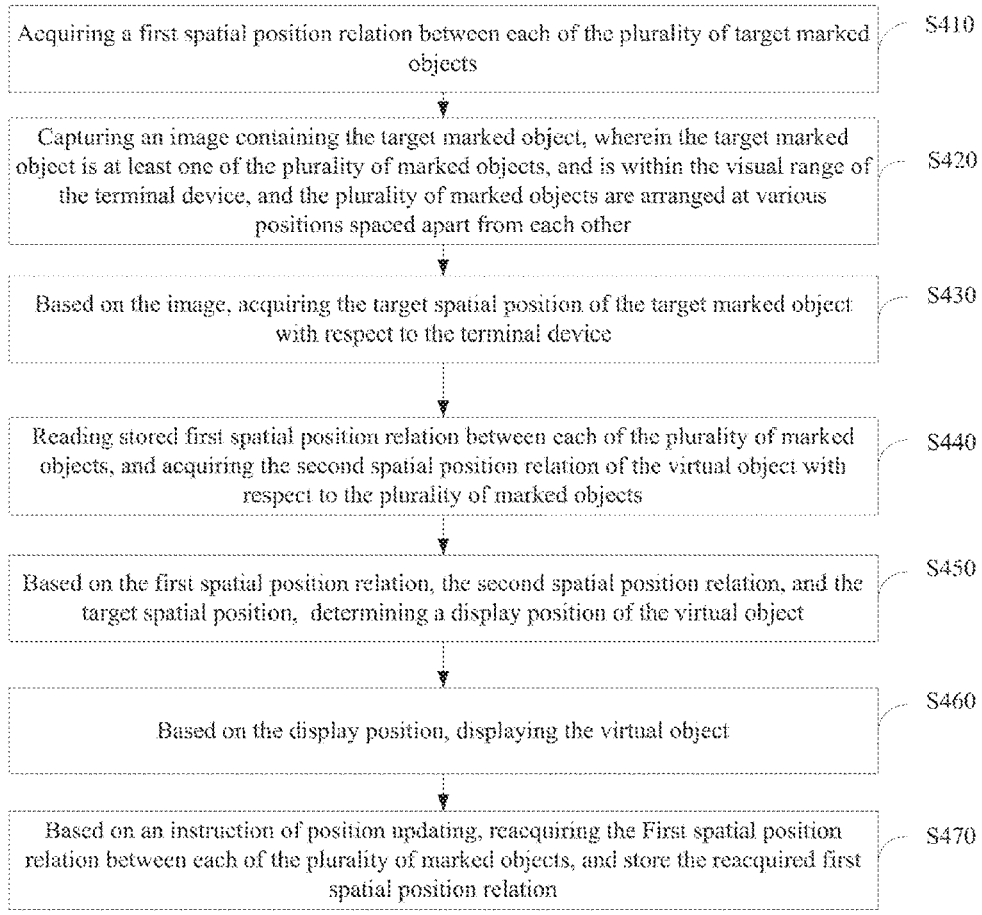
FIG. 4 is a diagram showing a method of displaying virtual content according to another embodiment of the present disclosure.

As shown in FIG. 4, another embodiment of the present disclosure may provide a method of displaying virtual content, which may be performed by a terminal device. The method may include following blocks.

At block S410, a first spatial position relation between each of the plurality of markers may be acquired.

In some embodiments, when the plurality of markers are all located within a visual range of a camera of the terminal device, the terminal device may capture an image containing all of the plurality of markers. The terminal device may recognize and track each of the plurality of markers in the captured image, and may acquire a spatial position of each of the plurality of markers relative to the terminal device and identities of each of the plurality of markers to establish a relative spatial position relation between various markers.

Figure 5:
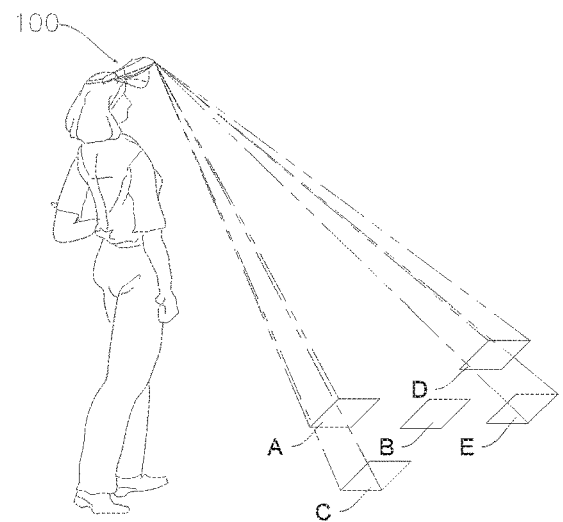
FIG. 5 is a scene of an embodiment of the present disclosure.
Figure 6A:
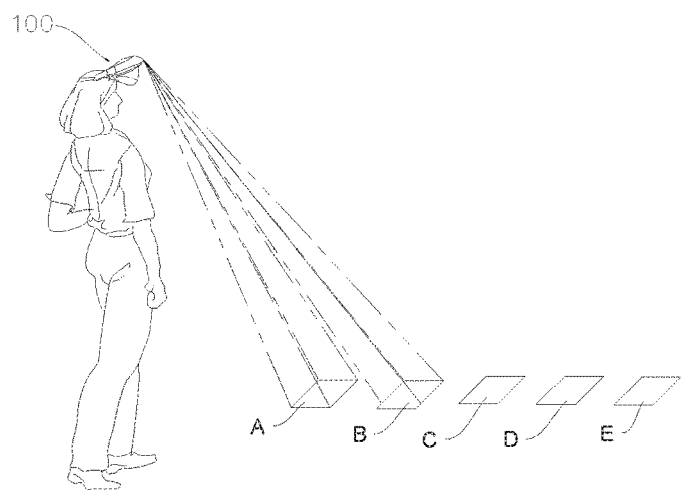
FIGS. 6a-6d are scenes of another implementation according to an embodiment of the present disclosure.
Figure 6B:
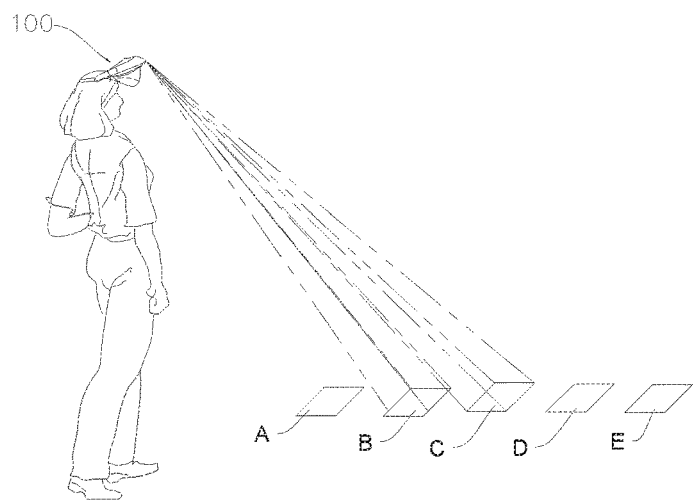
Figure 6C:
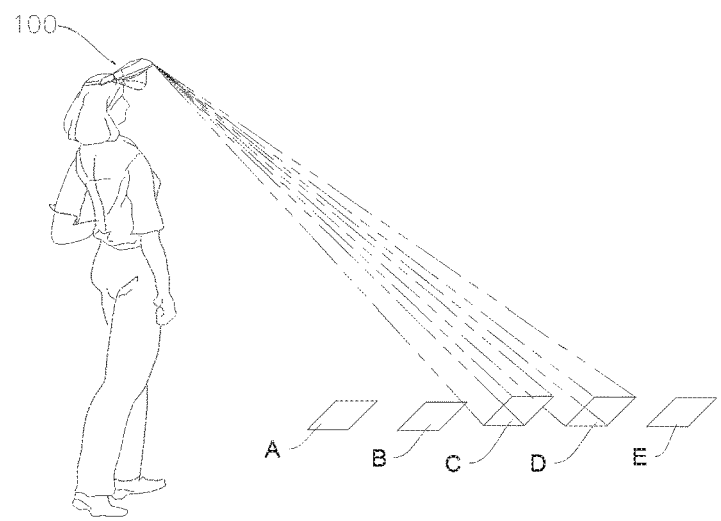
Figure 6D:
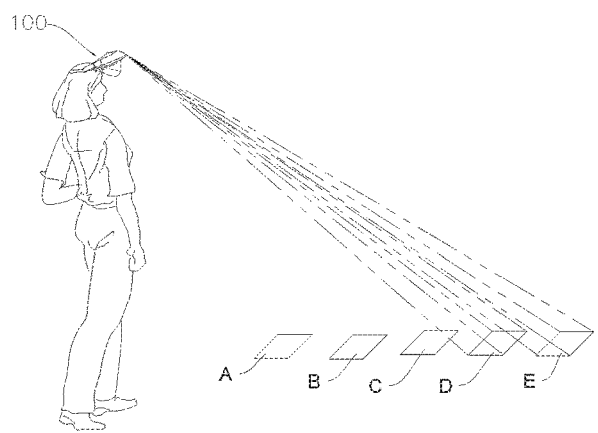

In a specific embodiment, based on the spatial position of each marker relative to the terminal device and identity of each marker, the terminal device may acquire a spatial position of each marker relative to the other markers to further acquire a relative spatial position relation between each of the markers. For example, as shown in FIG. 5, markers A, B, C, D, and E may be arranged in a scene. The terminal device may acquire an image which contains all of the markers A, B, C, D, and E to further acquire a spatial position of each of the markers relative to the terminal device. Based on the spatial position of each of the markers relative to the terminal device, the terminal device may acquire a relative spatial position relation between each two of the marker A, the marker B, the marker C, the marker D, and the marker E.

In another specific embodiment, based on the spatial position of each marker relative to the terminal device and identity of each marker, the terminal device may acquire a spatial position relation between two adjacently arranged markers to further acquire a relative spatial position relation between each of the markers. For example, the markers include a marker A, a marker B, a marker C, a marker D, and a marker E. The marker A and the marker B may be arranged adjacently, the marker B and the marker C may be arranged adjacently, the marker C and the marker D may be arranged adjacently, and the marker D and the marker E may be arranged adjacently. A spatial position relation between the marker A and the marker B, a spatial position relation between the marker B and the marker C, a spatial position relation between the marker C and the marker D, and a spatial position relation between the marker D and the marker E may be acquired individually to further acquire a relative position relation between each of the markers. It is only need to acquire at least four spatial position relations, wherein each of the at least four spatial position relations may be the spatial position relation between two adjacently arranged markers, and an island should not occur among the acquired spatial position relations between adjacent markers. The island may refer to an independent spatial position relation. Such an independent spatial position relation may correspond to two or more markers, and the two or more markers may not be included in any other spatial position relations. Therefore, when the island, i.e., the independent spatial position relation, does not occur, the relative position relation between each of the markers may be acquired by acquiring spatial position relations of every two adjacent markers only.

In some implementations, the terminal device may capture a plurality of images for markers, and recognize the markers captured in each of the plurality of images. Spatial position relations between different markers that are contained in each captured image may be acquired, and the relative spatial position relation between each of the markers may further be acquired. When the terminal device captures the plurality of images for each of the markers which are arranged at various positions with distance apart from each other, each of the captured images may contain at least two of the markers, and each of the markers may be contained in at least two captured images. It can be ensured that an island does not occur in a spatial position relation of the markers in each image. The island may refer to an independent spatial position relation. Such an independent spatial position relation may correspond to two or more markers, and the two or more markers may not be included in any other spatial position relations. Therefore, when the island, i.e., the independent spatial position relation, does not occur, the relative position relation between each of the markers may be acquired by acquiring spatial position relations of every two adjacent markers only. For example, as shown in FIGS. 6a to 6d, markers may include a marker A, a marker B, a marker C, a marker D, and a marker E, the terminal device may capture an image containing the marker A and the marker B in the first time, capture an image containing the marker B and the marker C in the second time, capture an image containing the marker C and the marker D in the third time, and capture an image containing the marker D and the marker E in the fourth time. The image captured in the first time and the image captured in the second time may contain the marker B in common. The image captured in the second time and the image captured in the third time may contain the marker C in common. The image captured in the third time and the image captured in the fourth time may contain the marker D in common.

Based on the spatial position relation between markers of each image, the terminal device may select a common marker that is contained in different images as a reference to acquire the first spatial position relation between each of the markers. For example, markers may include a marker A, a marker B, and a marker C. The terminal device may recognize an image, wherein the image may be captured in the first time and may contain the marker A and marker B, a spatial position of the marker A relative to the terminal device and a spatial position of the marker B relative to the terminal device may be acquired, respectively. A spatial position relation between the marker A and the marker B may further be acquired. The terminal device may recognize an image, wherein the image may be captured in the second time and may contain the marker B and the marker C, a spatial position of the marker B relative to the terminal device and a spatial position of the marker C relative to the terminal device may be acquired, respectively. A spatial position relation between the marker B and the marker C may further be acquired. Based on the spatial position relation between the marker A and the marker B and the spatial position relation between the marker B and the marker C, a relative spatial position relation of the marker A, the marker B, and the marker C may be acquired.

In some implementations, when a plurality of markers are arranged at various positions with distance apart from each other, and the plurality of markers are distributed in a wide range, as a visual range of the camera may be limited, an image containing all the markers cannot be captured for once. Therefore, a plurality of images may be captured to include all of the plurality of markers. Based on the plurality of images containing the plurality of markers, a relative spatial position relation between each of the markers may be established. For example, the plurality of markers may be divided into a first group of markers and a second group of markers. The first group of markers may include at least two markers, and the second group of markers may include at least one marker in the first group of markers and any other marker which is not in the first group of markers.

The terminal device may capture and recognize an image containing the first group of markers to acquire a spatial position of each marker in the first group of markers relative to the terminal device and identity of each marker in the first group of markers, and further acquire a spatial position relation between each marker in the first group of markers. The terminal device may capture an image containing the second group of markers and recognize the image to acquire a spatial position of each marker in the second group of markers relative to the terminal device and identity of each marker in the second group of markers, and further acquire a spatial position relation between each marker in the second group of markers. As the second group of markers may include at least one marker in the first group of markers, the marker which is in the first group of markers and in the second group of markers in common may be used as a reference. Based on the spatial position relation between each marker in the first group of markers and the spatial position relation between each marker in the second group of markers, a relative spatial position relation between each of the plurality of markers may be acquired.

Figure 7A:
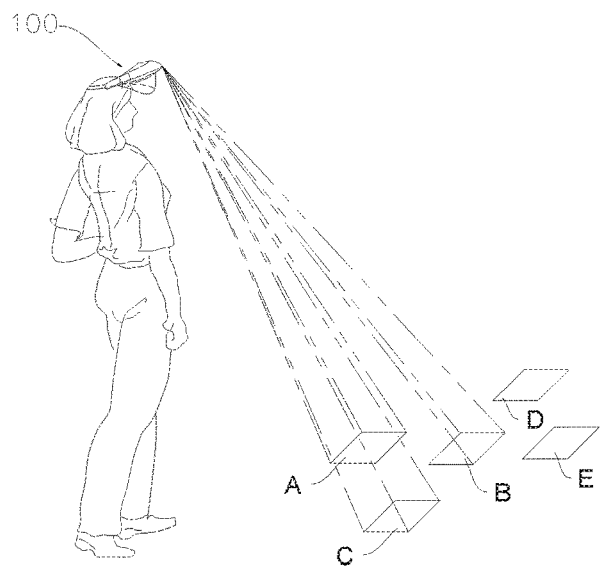

As shown in FIGS. 7a to 7b, in a scene, markers A, B, C, D, and E may be arranged. The terminal device 100 may capture an image containing a first group of markers, wherein the first group of markers may include markers A, B, and C. The terminal device may recognize the markers in the image of the first group of markers to acquire a spatial position relation of the markers A, B, and C. The terminal device 100 may further capture an image containing a second group of markers, wherein the second group of markers may include markers B, D, and E. The terminal device may recognize the markers in the image of the second group of markers to acquire a spatial position relation of the markers B, D, and E. The marker B may be used as a reference, a spatial position relation of the markers A, B, C, D, and E may be acquired. Acquisition of the spatial position relation of the first group of markers based on the image containing the first group of markers and acquisition of the spatial position relation of the second group of markers based on the image containing the second group of markers may refer to the method described in the above implementation, and the spatial position relation between each of the markers in the images may be acquired, which will not be repeatedly described.

According to another implementation, the terminal device may capture an image containing only one marker in each time. Based on position and pose change of the terminal device, a spatial position relation between each of the plurality of markers may be acquired. Specifically, the terminal device may capture an image in the nth time containing a marker Xn. The terminal device may recognize the markers Xn in the image to acquire position and pose of the marker Xn relative to the terminal device. The terminal device may capture an image containing a marker Xn+1 in the (n+1)th time. The terminal device may recognize the markers in the image containing the marker Xn+1 to acquire position and pose of the marker Xn+1 relative to the terminal device. Six degrees of freedom (6DOF) of the terminal device may be acquired at real time through a visual-inertial odometer (VIO). The 6DOF may include position and pose of the terminal device. A position change and an pose change of the terminal device capturing the image in the (n+1)th time relative to that of the terminal device capturing the image in the nth time may further be acquired. Based on the position change and pose change of the terminal device capturing the image in the (n+1)th time relative to that of the terminal device capturing the image in the nth time, and based on the position and pose of a marker Xn relative to the terminal device and the position and pose of a marker Xn+1 relative to the terminal device, a spatial position relation between the marker Xn and the marker Xn+1 may be acquired. The above-described operation may be performed to all of the plurality of markers, and the first spatial position relation between each of the plurality of markers may be acquired.

After the terminal device acquires the relative spatial position relation between each of the plurality of markers, the relative spatial position relation may be stored in the non-transitory memory and used to determine a display position of the virtual object.

At block S420, an image containing a target marker may be captured. The target marker may include at least one of the plurality of markers, and may be within the visual range of the terminal device, wherein the plurality of markers are arranged at various positions with distance apart from each other.

When only one of the plurality of markers is within the visual range of the camera, the one may be treated as the target marker. When two or more markers are within the visual range of the camera, one or more of the two or more markers may be selected to be the target marker.

At block S430, a target spatial position of the target marker relative to the terminal device may be acquired based on the captured image.

At block S440, the stored first spatial position relation between each of the plurality of markers may be read, and a second spatial position relation of the virtual object relative to the plurality of markers may be acquired.

The terminal device may acquire a spatial position relation between a position at which the virtual object needs to be superimposed to display in the real space and the position at which each of the plurality of markers is arranged. In some implementations, the position of the virtual object may be related to a spatial region defined by the plurality of markers. The position of the virtual object may be at a partial region of the spatial region, overlapping with the spatial region, or covering the spatial region. The spatial region defined by the plurality of markers may be a maximum region enclosed by the plurality of markers, wherein the plurality of markers may be located within the spatial region. For example, the virtual object may be a virtual chess board, a position of the chess board may be overlapping with a spatial region defined by a plurality of markers. A user may observe that, via the terminal device, the virtual chess board is superimposed to be displayed in the spatial region defined by the plurality of markers.

In some implementations, a spatial position relation may exist between the virtual object and a central position of the spatial region defined by the plurality of markers. The position of the virtual object may be overlapped with the central position of the spatial region, or the virtual object may be located at a designated position corresponding to the central position. For example, when the virtual object is a virtual decoration, a display position corresponding to the virtual decoration may be overlapping with the central position of the spatial region defined by the plurality of markers. A user may observe, via the terminal device, the virtual decoration is superimposed to be displayed at the central position of the spatial region defined by the plurality of markers.

In some implementations, there may be a spatial position relation between the virtual object and a predefined marker of the plurality of markers. The predefined marker may be a marker selected from the plurality of markers. A display position of the virtual object may be overlapped with a position of the predefined marker, or the virtual object may be located at a designated position corresponding to the position of the predefined marker. There may be a spatial position relation between the target marker which is located within the visual range of the camera and the virtual object. For example, the display position of the virtual object may be overlapping with a position of the target marker. Alternatively, the display position of the virtual object may be at a designated position corresponding to the target marker.

At block S450, the display position of the virtual object may be determined based on the first spatial position relation, the second spatial position relation, and the target spatial position.

In some embodiments, the display position of the virtual object may be overlapping with the position of the target marker, wherein the target marker is located within the visual range of the camera. The display position of the virtual object may be directly determined by the spatial position of the target marker relative to the terminal device. The spatial position of the target marker relative to the terminal device may be transformed into position coordinates of the target marker relative to the terminal device in the virtual space. The position coordinates may indicate the display position of the virtual object in the virtual space.

As shown in FIG. 8, in some embodiments, there may be a spatial position relation between the virtual object and the predefined marker of the plurality of markers. The S450 may further include following blocks.

At block S851, a central position of the spatial region defined by the plurality of markers may be acquired based on the first spatial position relation.

At block S852, the predefined marker may be acquired from the plurality of markers based on the central position. A distance between the predefined marker and the central position may be smaller than a distance between any one of other markers and the central position.

In some implementations, the predefined marker may be a marker located close to the central position of the spatial region defined by the plurality of markers. Based on the relative spatial position relation between each of the plurality of markers, the terminal device may acquire the central position of the spatial region defined by the plurality of markers, and determine the marker located close to the central position.

The terminal device may respectively calculate a distance between each marker and the central position. A marker which has the smallest distance to the central position may be acquired and determined to be the predefined marker.

At block S853, the display position of the virtual object may be determined based on the target spatial position, the second spatial position, and the spatial position relation between the predefined marker and the target marker.

Based on the spatial position relation between each of the plurality of markers, the terminal device may acquire the spatial position relation between the predefined marker and the target marker. Based on the spatial position relation between the virtual object and the predefined marker and the spatial position relation between the predefined marker and the target marker, the spatial position relation between the virtual object and the target marker may be acquired. Based on the target spatial position of the target marker relative to the terminal device and the spatial position relation between the virtual object and the target marker, the target marker may be selected to be a reference, the spatial position of the virtual object relative to the terminal device may be acquired, that is, the display position of the virtual object in the virtual space may be acquired.

At block S460, the virtual object may be displayed based on the display position.

In some embodiments, the terminal device may display a plurality of virtual objects. Positions of the plurality of virtual objects may be in one-to-one correspondence with and overlap with positions of the plurality of markers. Based on the spatial position of each target marker which is located within the visual range of the camera relative to the terminal device, and based on the relative spatial position relation between each of the plurality of markers, the spatial position of each marker relative to the terminal device may be acquired. Coordinate of the spatial position of each marker relative to the terminal device may be transformed, and a position coordinate of each marker relative to the terminal device in the virtual space may be acquired, that is, a virtual object corresponding to each marker may be displayed at a corresponded position.

For example, in an augmented reality scene showing a virtual table, virtual objects may include various kinds of virtual dishes. Each marker may correspond to each kind of virtual dish. The terminal device may recognize each marker located within a visual range. Based on a spatial position relation between the recognized marker and other marker(s), each virtual dish may be displayed by superimposing onto each marker correspondingly.

At block S470, the first spatial position relation between each of the plurality of markers may be reacquired based on an instruction of position updating, and the reacquired first spatial position relation may be stored.

In some embodiments, the relative spatial position relation between each of the plurality of markers may be changed, for example, a marker may be moved. Based on an operation of a user, the terminal device may receive an instruction of position updating, and the relative spatial position relation between each of the plurality of markers may be updated.

In some embodiments, reacquiring the first spatial position relation between each of the plurality of markers again and storing the reacquired first spatial position relation may include a block (a) and a block (b).

At block (a), an image containing a part of the plurality of markers may be acquired, wherein a part of the plurality of markers include the marker whose position is changed and at least one of the other markers. The other markers may be markers from the plurality of markers without any position change.

Since a small amount of markers may be moved, only position relations of the markers whose positions are changed relative to other unmoved markers may be determined. The terminal device may be operated by the user to capture an image containing the marker with the position change and at least one of the other markers. Based on the captured images, the terminal device may determine a spatial position relation between the marker with the position change and at least one of the unmoved markers.

At block (b), an updated first spatial position relation may be acquired based on the image containing a part of the plurality of markers and the previously acquired first spatial position relation between each of the plurality of markers.

The terminal device may recognize the captured image to acquire a spatial position of the marker with the position change relative to the terminal device, and identity of the marker. The terminal device may further acquire spatial positions of the markers without the position change relative to the terminal device and identities of the markers. Based on the spatial position of the marker with the position change relative to the terminal device and the spatial position of the markers without the position change relative to the terminal device, a spatial position relation between the marker with the position change and the markers without the position change may be acquired. The markers without the position change may be used as references, and the terminal device may acquire a relative spatial position relation between each of the plurality of markers after the position change by using the previously stored spatial position relation between each of the plurality of markers.

In some embodiments, the terminal device may capture a plurality of images for the plurality of markers to detect whether a position of any one of the plurality of markers is changed. The detection of whether the position of any one of the plurality of markers is changed may be automatically performed during the user experiencing the augmented reality, and may not be performed deliberately.

According to the method provided in the above-mentioned embodiments, by recognizing and tracking at least one of the plurality of markers, the virtual object may be superimposed to be displayed at a corresponding position, improving interaction of the augmented reality.

Figure 9B:
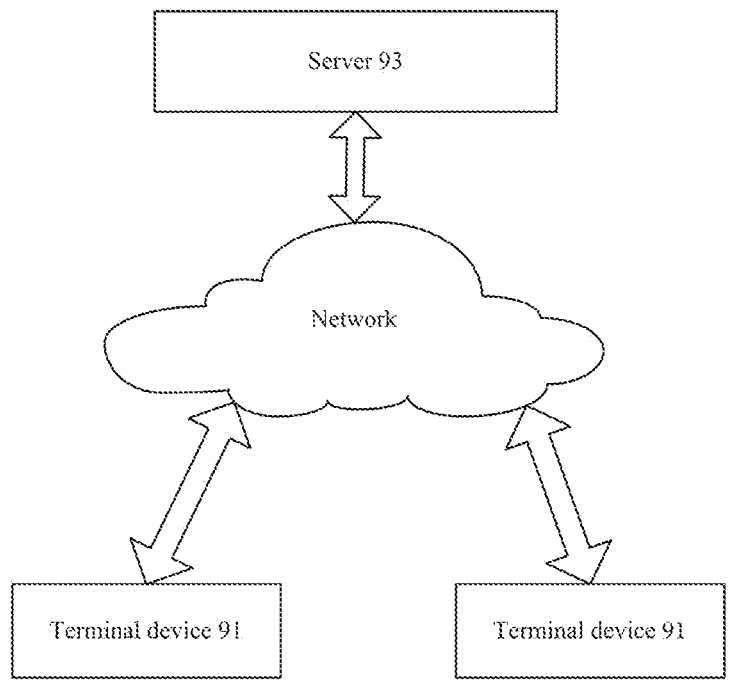

As shown in FIGS. 9a and 9b, an augmented reality system 90 is provided in another embodiment of the present disclosure, and the augmented reality system 90 may include a terminal device 91 and a marker 92. The terminal device 91 may recognize the marker in a captured image to acquire a position and rotational relation of the terminal device 91 relative to the marker 92, and display a corresponded virtual object. The terminal device 91 may communicatively connected to a server 93 through a network. A client application may run on the terminal device 91, and a server application corresponding to the client application may run on the server 93. As an implementation, a plurality of terminal devices 91 may synchronize data through the server 93.

Figure 10:
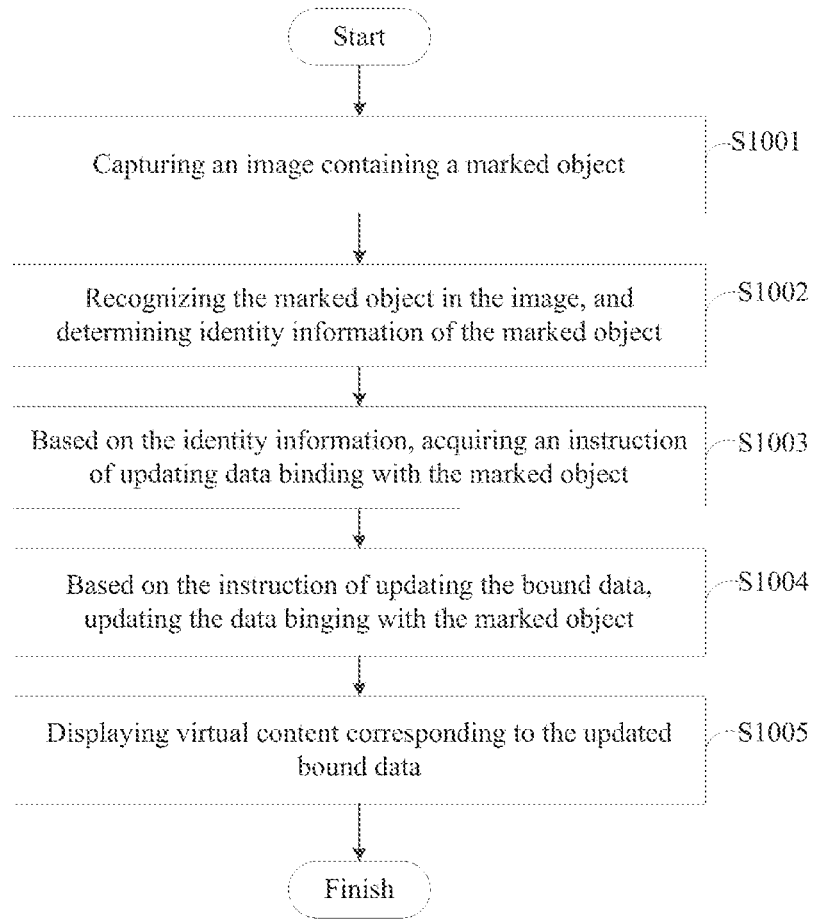
FIG. 10 is a diagram showing a method of updating data according to an embodiment of the present disclosure.

As shown in FIG. 10, a method of updating data may be provided by an embodiment of the present disclosure. The method may update data binding with a marker, such that different virtual images may be displayed through a same marker. The method may be applied to the terminal device 91, and include following blocks.

At block S1001, an image containing a marker may be captured.

At block S1002, the marker may be recognized, and an identity of the marker may be determined.

In some embodiments, the marker may be any pattern or any object having a recognizable characteristic mark. The identity corresponding to the marker may be an identity code containing at least one of a number, a letter, and a symbol or a combination thereof. Based on a topological structure of the pattern of the marker, different markers may correspond to different an identity.

At block S1003, an instruction of updating the data binding with the marker may be received based on the identity of the marker.

The identity of the marker may correspond to the virtual image data binding with the marker. Based on the determined identity of the marker, the terminal device may acquire the updating instruction corresponding to the marker. The instruction may be executed to modify the virtual image data binding with the marker.

In some embodiments, the virtual image data binding with the marker may be set through the client application of the terminal device. For example, the terminal device may recognize that a serial number of the marker is "No. 7", the user may update the data binding with the marked of "No. 7" at a client side, through a client application, to generate an updating instruction corresponding to the marker of "No. 7". The virtual image data bound with the marker of "No. 7" and stored locally may be updated.

In some embodiments, the virtual image data binding with the marker may be set through the server, the client application of the terminal device may acquire the virtual image data from the server, such that data synchronization may be achieved. For example, the terminal device may recognize that the serial number of the marker is "No. 7", and send the serial number "No. 7" to the server. The server may determine whether the bound data needs to be updated. When a feedback from the server suggests the bound data needs to be updated, an instruction corresponding to the marker for updating data may be generated, and the virtual image data bound with the marker of "No. 7" and stored locally may be updated. The server may store identities of a plurality of markers and data binding with each of the plurality of markers.

In one embodiment, the client application of the terminal device may check with the server in advance whether the bound data corresponding to the identity of the marker has been updated on the server. Based on the feedback from the server, the client application of the terminal device may determine whether an updating instruction corresponding to the marker needs to be generated. The client application may send a request of searching bound information to the server, wherein the bound information corresponds to the identity of the marker. After receiving the request of searching bound information, the server may provide a feedback to the client application indicating a result of updating the bound data corresponding to the identity of the marker. As an implementation, the bound information corresponding to the marker may include virtual image data currently binding with the identity and the result of updating the bound data which corresponds to the identity of the marker. The result of updating the bound data may indicate, comparing with a previous access of the client application to the server, whether the bound data which corresponds to the identity has been updated. The client application may receive the result of updating the bound data from the server, and determine whether the bound data which corresponds to the identity has been updated based on the result of updating the bound data.

In some embodiments, the terminal device may acquire a data identifier from the server, wherein the data identifier may bind with the identity corresponding to the marker. The terminal device may compare the data identifier acquired from the server with a data identifier binding with the corresponded marker in the terminal device, and determine consistency of the two data identifiers, such that a result of updating the bound data may be generated correspondingly. As an implementation, the result of updating the bound data may be a symbol indicating whether the bound data corresponding to the marker has been updated on the server. For example, when the bound data is updated, the result of updating the bound data may be "1"; when bound data is not updated, the result of updating the bound data may be "0".

When the bound data corresponding to the identity of the marker is updated, an updating instruction corresponding to the marker may be generated to allow the terminal device to update the data binding with the marker.

In one embodiment, the terminal device may update the bound data which corresponds to the marker on the client application, and synchronize the updating to the server. The user may input the identity of the marker which needs to be updated the bound data into the terminal device, and transmit data which needs to be rebound. The transmission may be performed by other terminals, by searching from the internet, or by other means. The terminal device may acquire the identity of the marker which needs to be updated the bound data to and the data which needs to be rebound. The terminal device may send the identity and the data which needs to be rebound to the server. The server may update the bound data of the corresponded marker according to the identity.

At block S1004, the data binding with the marker may be updated based on the updating instruction corresponding to the marker.

The terminal device may acquire the data that needs to be rebound according to the updating instruction, and update the formerly bound data. For example, a marker with a serial number of "No. 2" may correspondingly bind with virtual image data of "a vase". The terminal device acquires the updating instruction, and the virtual image data of "a vase" which correspondingly binds with the marker of "No. 2" may be updated to be virtual image data of "an ox".

As an implementation, prior to updating the bound data corresponding to the marker, first data which is bound with the marker may be stored locally on the client side (for example, on the non-transitory memory of the terminal device), second data which is to be bound for replacing may also be stored locally on the client side. In addition, the second data which is to be bound for replacing may be acquired from the server, the terminal device may search the corresponded second data on the server, download the second data, and store the second data locally to update the bound data corresponding to the marker. As an implementation, the terminal device may firstly search the corresponded second data locally, when the second data cannot be found from the local storage, the terminal device may acquire the second data from the server. The second data which is to be bound for replacing may be sent from a terminal to the server and stored on the server, and then synchronized with each client. When the bound data corresponding to the identity of the marker on the server side is updated, each client application, which accesses the server, may synchronously update the bound data. By updating once on the server side, synchronization of data may be achieved on all clients (terminals) which access the server.

At block S1005, virtual content which corresponds to the data to be bound for replacing may be displayed.

The terminal device may bind the marker with updated data, and then generate a virtual image correspondingly for display. As an implementation, the terminal device may display a process of updating the bound data. The terminal device may generate and display a first virtual image based on the formerly bound data. After the marker is bound with the updated data, the terminal device may generate and display a second virtual image. In this way, a process of transformation from the first virtual image to the second virtual image may be shown. For example, a marker of "No. 3" is formerly bound with virtual image data of "an ox", and data to be bound for replacing may be virtual image data of "a poster". After the bound data corresponding to the marker of "No. 3" is updated, the user may observe through the terminal device that the display content is transforming from a virtual image of "an ox" into a virtual image of "a poster". Visually, the user may have a perception of dynamic transformation, wherein the dynamic transformation may be gradual transformation, abrupt transformation, or the like, and the transformation may be set specifically according to an actual demand. In another implementation, the updating bound data may be performed while the screen is off. After the bound data is updated, screen may then be turned on to display a virtual image corresponding to the updated bound data.

According to the method of updating data provided by the present embodiment, virtual image data binding with a same marker may be updated without changing the marker. The method may be adapted to numerous scenes of virtual reality or augmented reality. For example, in an augmented reality museum, the number and positions of set markers may be relatively fixed, virtual image data binding with a same marker on a booth may be modified. In this way, virtual images of various exhibits may be displayed over different time periods to adapt to various exhibition themes, such as an ancient exhibition, a technology exhibition, an art exhibition, and the like. For example, in an augmented reality multimedia classroom, lecture content given by a lecturer may be variable from day to day. Virtual image data of lecture handouts may be bound with a marker correspondingly. When the handouts need to be modified, updating the virtual image data of the handouts binding with the marker on the client or the server, modification of the handouts may be achieved. Further for example, in a shopping center, previous advertisement content which is bound with a marker may be replaced by new advertisement content, such that various advertisement content may be displayed over different time periods, costs of frequently changing the marker may be reduced, and the various advertisement content may be displayed continuously for a long period of time, improving commercial benefits of advertisements.

In some embodiments, the terminal device may provide an option to the user, allowing the user to set a period of updating the bound data. For example, the option for the user to set a period of updating the bound data may be displayed on a human-device interaction interface. After the setting is completed on the client side, the period of updating the bound data may be sent to the server. Based on the period of updating the bound data, the server may periodically update the data binding with the marker. The period of updating the bound data may be set for a plurality of markers synchronously, or set for an individual marker. The data to be rebound for replacing may be a set of virtual image data stored on the server in advance. The data binding with the marker may be replaced by the virtual image data according to a serial number of each virtual image data or by a virtual image data randomly selected from the set of virtual image data.

In some embodiments, after capturing a marker and confirming an identity of the marker, the terminal device may acquire duration of the marker being accessed over a predefined period of time from the server. The duration of the marker being accessed over a predefined period of time may be duration of the marker being captured by a terminal device or various terminal devices and being displayed a virtual image correspondingly over the predefined period of time. When the duration of the displayed virtual image corresponding to the captured marker over the predefined period of time is less than a predefined certain value, it may be indicated that total time of the virtual image corresponding to the marker being viewed over the predefined period of time is relatively less. To some extent, it may reflect that the virtual image bound with the marker is not attractive to viewers. A request of replacing may be sent to the server, such that the server may replace the virtual image data binding with the marker. As an implementation, each time after the terminal device captures the marker and displays the corresponded virtual image, a log of a relation between the marker and the duration of the marker being accessed may be generated. Therefore, a plurality of logs may be generated after the marker is accessed for a plurality of times by various terminals, and the plurality of logs may be uploaded to the server. The server may acquire the duration of the marker being accessed from each of the plurality of logs and calculate a sum of the duration of the marker being accessed based on the plurality of logs. The server may correlate the sum of the duration of the marker being accessed with dates of accesses, such that total duration of the marker being accessed over the predefined period of time may be acquired.

Figure 11:
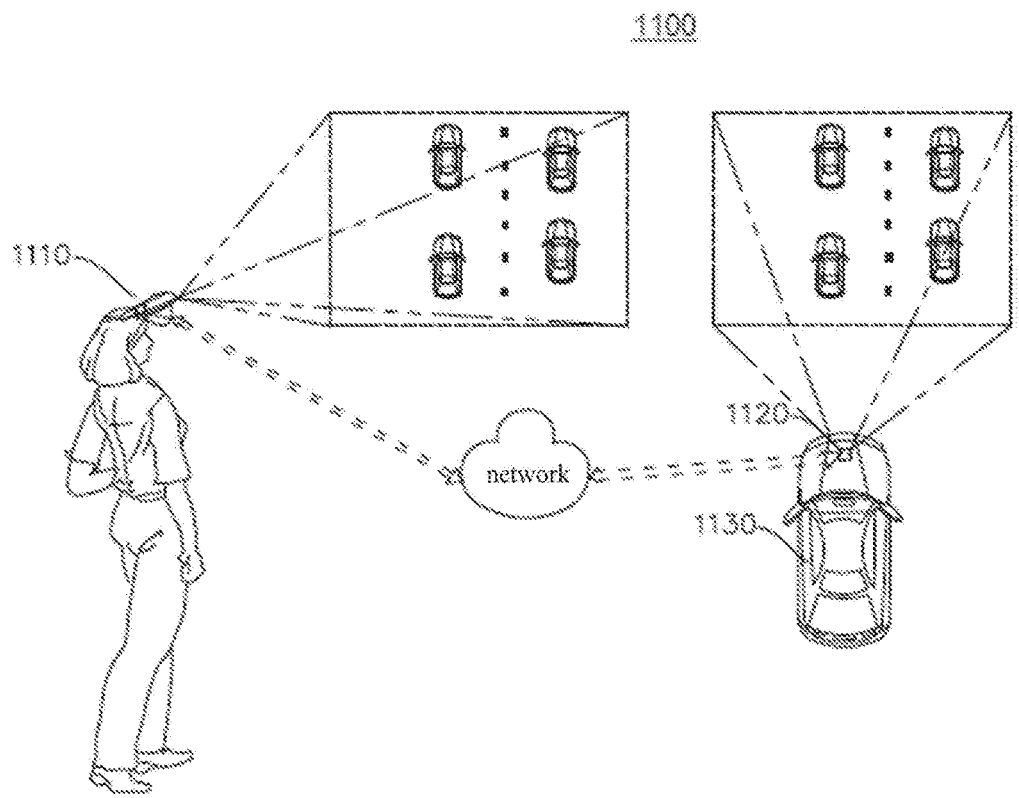
FIG. 11 shows still another system of augmenting reality according to an embodiment of the present disclosure.

As shown in FIG. 11, an augmented reality system 1100 may be provided according to another embodiment of the present disclosure. The augmented reality system 1100 may include a terminal device 1110, a camera 1120, and a carrier 1130. The camera 1120 may be disposed on the carrier 1130. As an implementation, the camera 1120 may be configured on a top of the carrier 1130 through a rotational mechanism. The rotational mechanism may be rotatable under control, such that the camera 1120 may be driven to rotate relative to the carrier 1130, and pose of the camera 1120 relative to the carrier 1130 may be changed. A position of which the camera 1120 is arranged on the carrier 1130 may not be limited, for example, the camera 1120 may be arranged at a rear-end of the carrier 1130. The terminal device 1110 and the camera 1120 may be communicatively connected, the communicative connection may be established by Wireless Fidelity (Wi-Fi), General Packet Radio Service (GPRS), 4G, 5G, or the like, which is not limited herein. The camera 1120 may be configured to capture images of scenes surrounding the carrier and send the scene images to the terminal device 1110. The mage capturing device 1120 may be a color camera, an infrared camera, or the like.

Figure 12:
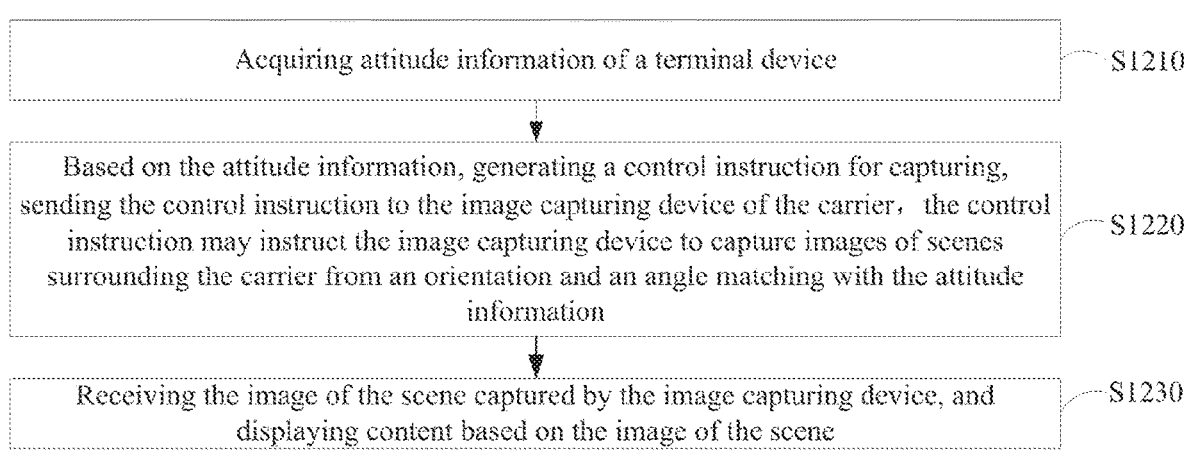
FIG. 12 is a diagram showing a method of capturing images according to an embodiment of the present disclosure.

As shown in FIG. 12, a method of image capturing may be provided by an embodiment of the present disclosure. The method may be applied to the terminal device 1110 and include following blocks.

At block S1210, pose of the terminal device may be acquired.

In some embodiments, a pose sensor may be configured in the terminal device to detect the pose of the terminal device. The pose sensor may be a pose measurement system for three dimensional motion based on the Micro-Electro-Mechanical System (MEMS). The pose sensor may include a three axis gyro, a three axis accelerometer and a three axis electronic compass. The pose sensor may acquire the pose of the terminal device through an embedded low-power processor. The pose of the terminal device may include an orientation and a rotational angle of the terminal device. The terminal device may acquire the pose of the terminal device through an internal inertial measurement unit (IMU).

At block S1220, a capturing control instruction may be generated based on the pose of the terminal device, and sent to the camera arranged on a carrier. The capturing control instruction may instruct the camera to rotate to an orientational angle matching with the pose to capture scene images surrounding the carrier.

The camera may be controlled through the pose of the terminal device, such that the camera may capture images from a required orientation. In some embodiments, based on an acquired orientational angle of the terminal device, the terminal device may acquire an angle for which the camera needs to rotate and an orientation to which the camera needs to rotate. Specifically, the camera may have an initial orientation status, and predefined pose may be set in advance, wherein the predefined pose of the terminal device may correspond to the initial orientation status of the camera. When the pose acquired by the terminal device is the same as the predefined pose, the camera may not need to adjust the orientation, and the generated capturing control instruction may instruct the camera not to rotate for adjustment. When the pose acquired by the terminal device is different from the predefined pose, the terminal device may determine an orientation to which the camera is required to rotate and an angle for which the camera is required to rotate, based on a relative difference between the acquired pose and the predefined pose. A capturing control instruction may be generated to instruct the camera to rotate towards the required orientation and rotate the required angle, such that the orientation of the camera may correspond to the pose of the terminal device.

After the generated capturing control instruction is sent to the camera, the orientation of the camera may be adjusted according to the capturing control instruction. In this way, the orientation of the camera may match with the pose of the terminal device, and the orientational angle of which the camera is set to capture scenes surrounding the carrier may be matched with the pose of the terminal device. Therefore, controlling the orientational angle of the camera through the pose of the terminal device may be achieved.

At block S1230, the image of the scene captured by the camera may be acquired, and display content may be displayed based on the image of the scene.

After the camera capture the image of the scene surrounding the carrier from an angle matching with the pose of the terminal device, the camera may transmit the image of the scene to the terminal device. After the terminal device receives the image of the scene captured by the camera, the terminal device may display corresponded content based on the image of the scene. In some embodiments, the terminal device may display the image of the scene as the display content directly. Alternatively, the terminal device may generate a virtual image based on the image of the scene, and display the generated virtual object.

When the pose of the terminal device is changed, the angle of the camera may be adjusted correspondingly, such that the angle of the camera may match with the changed pose of the terminal device.

In some embodiments, the terminal device may compare pose collected at two adjacent times, such as compare pose collected at present with pose collected formerly. When a change of the pose collected at present relative to the pose collected formerly is greater than a predefined change, the terminal device may control the camera to change the orientational angle. When a relatively large difference is determined to exist between the pose of the terminal device and the predefined pose, the terminal device may control the orientation of the camera to adjust on the basis of the initial orientation status of the camera. Changes of the orientational angle of the camera caused by the user's misoperation, such as a shaking of the terminal device, may be avoided.

In some embodiments, the terminal device may be a head mounted display which can be worn by a user. Pose detected by the head mounted display may be changed as the user's head moves. When a change is detected, the terminal device may adjust the angle of the camera, that is, the terminal device may send a control instruction to the camera, the camera may adjust the angle and capture a corresponded image of a scene, such that the user may adjust the angle of the camera according to movements of the head. After receiving the image of the scene captured by the camera, the terminal device may display corresponded content and present the content to the user by the visual means of AR/VR.

According to the method provided by the embodiments of the present disclosure, the camera on the carrier may capture the image of the scene surrounding the carrier from an angle matching with the pose of the terminal device. The image may be transmitted to the terminal device for display, such that the user may capture the image of the scene from a desired angle and orientation.

In some embodiments, one or more markers may be arranged in an active scene of the carrier. When the one or more markers is located within a visual range of the camera, the camera may capture an image containing at least one of the one or more markers and transmit the image to the terminal device. The terminal device may receive the image, and may recognize the markers in the image to obtain position and pose of the camera relative to the markers and identities of the markers. The pose may be an orientation and a rotational angle of the camera relative to the markers. The terminal device may recognize identities of the markers, acquire virtual object data corresponding to the markers, and display the virtual object data to augment immersive and realistic perception of the real environment.

In some embodiments, the terminal device may use the position and the pose of the camera relative to the markers as a position and a pose of the terminal device relative to the markers. Based on the position and the pose of the terminal device relative to the markers, the terminal device may determine a display position of a virtual object in a virtual space, and display the virtual object.

In a scene of simulated driving, the above-mentioned virtual object may be a virtual road. The terminal device may store data of the virtual road. Based on the position pose, and the identity of the captured image of the markers, the virtual road may be displayed to achieve an effect of simulated driving.

In an embodiment, the terminal device may superimpose the virtual object onto the captured image of the scene to achieve an effect of augmented reality. For example, in some scenes, the above-mentioned virtual object may be a virtual signpost, and the virtual signpost may be superimposed onto the captured image of the real scene.

In a scene of simulated driving, the above-mentioned virtual object may be a virtual obstruct, such as a virtual vehicle, a virtual person, and the like. The virtual obstruct may be superimposed onto the markers, and the user may control the carrier to avoid the virtual obstruct based on the virtual obstruct observed by the user to improve the realistic perception of the simulated driving.

In some embodiments, the terminal device may remotely control the carrier. After receiving the image of the scene captured by the camera, the image of the scene may be displayed directly, such that the user may acknowledge the scene surrounding the carrier.

In some embodiments, the terminal device may determine whether the pose of the terminal device is changed over a first predefined period of time. When the pose of the terminal device is not changed, it may be suggested that the present angle of the camera is not changed, and images of multiple frames captured by the camera may be synthesized into one image to be displayed.

The visual range of the camera is typically less than a visual range of a human, when the image of the scene captured by the camera is displayed, the realistic perception of the user may be inadequate. When the pose of the terminal device is not changed over the first predefined period of time, the terminal device may control the camera to rotate within a certain range to capture images of multiple frames, and the images of multiple frames captured by the camera may be synthesized into one image to be displayed. As a specific implementation, to ensure the images of multiple frames are captured at close time points, the camera may be controlled to rotate at a predefined speed and capture the images at a predefined frequency, such that the images of multiple frames are captured by the camera from close angles. For example, the camera may be controlled to rotate within a range of 15" to 30" to capture images of the scene from various orientational angles. The images of the scene captured from various angles and orientations by the camera may be synthesized into one image to be displayed. The user may view the image of the scene with a relatively large visual range.

In some embodiments, by tracking a change of vision focus, the angle of the camera may be controlled. The terminal device may acquire an image of eyes of a user, image data of retina and cornea of the user may be captured, and a three dimensional model of the eyes may be constructed based on the image data. The vision focus may be tracked through the three dimensional space, and information of the change of the user's vision focus may be acquired. At last, based on the information of the change of the user's vision focus, a control instruction may be generated and sent to the camera to control the angle of the camera. For example, when the user's vision focus is detected to move to a left, a control instruction may be generated to instruct the camera to rotate for a certain angle in an anti-clockwise direction in the horizontal plane.

In some embodiments, photographic parameters of the camera may be adjusted by the terminal device. For example, through a control operation performed to the terminal device by the user, a control instruction may be generated to instruct the camera to adjust the photographic parameters, such as the focus, time of exposure, the aperture, and the like.

In a scene, the carrier may be communicatively connected to a remote controller, and based on a carrier controlling instruction from the remote controller, the carrier may adjust driving direction and speed. When the carrier controlling instruction is a control instruction for changing the driving direction, the carrier may adjust the driving direction according to the carrier controlling instruction. At the same time, as the driving direction of the carrier is changed, content of the surrounding scene which may be captured by the camera may also be changed. The camera may send the captured image of the scene to the terminal device for display.

According to the method of the above-mentioned embodiments, the user may observe an image with a relatively large visual range, and the realistic perception during observing may be improved.

In an embodiment, the present disclosure may provide a computer readable storage medium. The computer readable storage medium may store a program code. The program code may be invoked by a processor to execute the method as described in the above-mentioned embodiments.

The computer readable storage medium may be an electronic memory, such as a flash memory, an Electrically Erasable Programmable Read Only Memory (EEPROM), an Erasable Programmable Read Only Memory (EPROM), a hard disc, a Read-Only Memory (ROM), or the like. Alternatively, the computer readable storage medium may include a nonvolatile computer readable medium. The computer readable storage medium may have a storage space to store program codes, wherein the program codes may allow execution of any method and block of the above-described methods. The program codes may be read from one or more computer program products, or may be written into the one or more computer program products. The program codes may be compressed by appropriate means for instance.

It should be noted that the above embodiments are only for purposes of illustrating the technical solutions of the present application, but not to limit the present disclosure. Although the present disclosure is described in detail with reference to the foregoing embodiments, ordinary skilled in the related art shall understand that they may modify the technical solutions described in the foregoing embodiments, or equivalently substitute some of the technical features. The modifications or substitutions do not drive the essence of the corresponding technical solutions to depart from the spirit and scope of the technical solutions of the embodiments of the present disclosure.

What is claimed is:

1. A method of displaying virtual content, applied to a terminal device, comprising:
acquiring a first spatial position relation between each of a plurality of markers, the plurality of markers being arranged at various positions of a real scene and spaced apart from each other, comprising:
capturing, in a nth time, an image containing only a marker Xn of the plurality of markers, and recognizing the marker Xn in the image to acquire a position and a pose of the marker Xn relative to the terminal device;
capturing, in a (n+1)th time, an image containing only a marker Xn+1 of the plurality of markers, and recognizing the marker Xn+1 in the image to acquire a position and a pose of the marker Xn+1 relative to the terminal device;

acquiring, through a visual-inertial odometer of the terminal device, six degrees of freedom (6DOF) of the terminal device in real time, the 6DOF comprising a position and a pose of the terminal device;

acquiring a position change and a pose change of the terminal device in the (n+1)th time relative to that of the terminal device in the nth time; and acquiring a spatial position relation between the marker Xn and the marker Xn+1, based on the position change and the pose change of the terminal device, the position and the pose of the marker Xn relative to the terminal device, and the position and the pose of the marker Xn+1 relative to the terminal device;

capturing, through a camera of the terminal device, an image comprising a target marker, wherein the target marker is at least one marker of the plurality of markers;

acquiring a target spatial position of the target marker relative to the terminal device based on the captured image;

acquiring a second spatial position relation of a virtual object relative to the plurality of markers;

determining a display position of the virtual object based on the first spatial position relation, the second spatial position relation, and the target spatial position; and displaying the virtual object based on the display position.

2. The method of claim 1, wherein the second spatial position relation of the virtual object relative to the plurality of markers comprises at least one selected from the group consisting of:

a spatial position relation between the virtual object and a spatial region defined by the plurality of markers;

a spatial position relation between the virtual object and a central position of a region defined by the plurality of markers;

a spatial position relation between the virtual object and a predefined marker of the plurality of markers; and a spatial position relation between the virtual object and the target marker.

3. The method of claim 1, wherein the second spatial position relation is a spatial position relation between the virtual object and a predefined marker of the plurality of markers; and the determining a display position of the virtual object based on the first spatial position relation, the second spatial position relation, and the target spatial position comprises:

acquiring a central position of a region defined by the plurality of markers based on the first spatial position relation;

acquiring the predefined marker from the plurality of marker based on the central position, wherein a distance between the predefined marker and the central position is less than a distance between any other one of the plurality of markers and the central position; and determining the display position of the virtual object based on the target spatial position, the second spatial position relation, and a spatial position relation of the predefined marker relative to the target marker.

4. The method of claim 1, further comprising:

reacquiring the first spatial position relation between each of the plurality of markers and storing the reacquired first spatial position relation, based on a position updating instruction.

5. The method of claim 4, wherein the reacquiring the first spatial position relation between each of the plurality of markers and storing the reacquired first spatial position relation comprises:

capturing an image comprising a part of the plurality of markers, wherein the part of the plurality of markers comprises a marker having a position change and at least one marker without a position change; and acquiring and storing the first spatial position relation between each of the plurality of markers, based on the image comprising the part of the plurality of markers and the first spatial position relation between each of the plurality of markers.

6. The method of claim 4, wherein, prior to the reacquiring the first spatial position relation between each of the plurality of markers and storing the reacquired first spatial position relation, based on a position updating instruction, the method further comprising:

capturing, through the terminal device, a plurality of images for the plurality of markers automatically during a user experiencing an augmented reality to detect whether a position of any one of the plurality of markers is changed; and receiving, through the terminal device, the position updating instruction when a position change of any one of the plurality of markers is detected.

7. The method of claim 4, wherein, prior to the reacquiring the first spatial position relation between each of the plurality of markers and storing the reacquired first spatial position relation, based on a position updating instruction, the method further comprising:

receiving, through the terminal device, the position updating instruction based on an operation of a user.

8. A terminal device, comprising one or more processors, a non-transitory memory storing one or more programs, wherein the one or more programs comprise at least one instruction and the instructions which, when executed by the one or more processors, cause the one or more processors to perform operations of:

capturing, through a camera of the terminal device, an image comprising a target marker, wherein the target marker is at least one marker of a plurality of markers, and the plurality of markers are arranged at various positions with distance apart from each other;

acquiring a target spatial position of the target marker relative to the terminal device based on the captured image;

acquiring a first spatial position relation between each of the plurality of markers and acquiring a second spatial position relation of a virtual object relative to the plurality of markers;

determining a display position of the virtual object based on the first spatial position relation, the second spatial position relation, and the target spatial position;

displaying the virtual object based on the display position; and reacquiring, in response to a position updating instruction, the first spatial position relation between each of the plurality of markers and storing the reacquired first spatial position relation, comprising:

capturing an image which contains a marker with a position change included in the plurality of markers and a marker without a position change included in the plurality of markers;

recognizing the captured image to acquire a spatial position of the marker with the position change relative to the terminal device and an identity of the marker with the position change;
acquiring a spatial position of the marker without the position change relative to the terminal device and an identity of the marker without the position change;
acquiring a spatial position relation between the marker with the position change and the marker without the position change, based on the spatial position of the marker with the position change relative to the terminal device and the spatial position of the marker without the position change relative to the terminal device, thereby acquiring an updated first spatial position relation; and
storing the updated first spatial position relation.

9. The terminal device of claim 8, wherein the second spatial position relation of the virtual object relative to the plurality of markers comprises at least one selected from the group consisting of:
a spatial position relation between the virtual object and a spatial region defined by the plurality of markers;
a spatial position relation between the virtual object and a central position of a region defined by the plurality of markers;
a spatial position relation between the virtual object and a predefined marker of the plurality of markers; and
a spatial position relation between the virtual object and the target marker.

10. The terminal device of claim 8, wherein the second spatial position relation of the virtual object relative to the plurality of markers is a spatial position relation between the virtual object and a predefined marker of the plurality of markers;
wherein the determining a display position of the virtual object based on the first spatial position relation, the second spatial position relation, and the target spatial position comprises:
acquiring a central position of a region defined by the plurality of markers based on the first spatial position relation;
acquiring the predefined marker from the plurality of marker based on the central position, wherein a distance between the predefined marker and the central position is less than a distance between any other one of the plurality of markers and the central position; and
determining the display position of the virtual object based on the target spatial position, the second spatial position relation, and a spatial position relation of the predefined marker relative to the target marker.

11. The terminal device of claim 8, wherein, prior to the capturing, through a camera of the terminal device, an image comprising a target marker, the instructions which, when executed by the one or more processors, cause the one or more processors to further perform operations of:
capturing an image comprising the plurality of markers which are arranged with distance apart from each other and acquiring the image comprising the plurality of markers; and
acquiring the first spatial position relation between each of the plurality of markers based on the image comprising the plurality of markers.

12. The terminal device according to claim 8, wherein, prior to the capturing, through a camera of the terminal device, an image comprising a target marker, the instructions which, when executed by the one or more processors, cause the one or more processors to further perform operations of:
capturing the plurality of markers for a plurality of times to obtain a plurality of images, wherein the plurality of markers are arranged with distance apart from each other, each of the plurality of images comprises at least two markers, and any two of the plurality of images comprise at least one same marker;
acquiring a position relation between each marker in each of the plurality of images, based on the plurality of images obtained from the plurality of times of capturing; and
acquiring the first spatial position relation between each of the plurality of markers, based on the position relation between each marker in each of the plurality of images.

13. The terminal device of claim 8, wherein, prior to the capturing, through a camera of the terminal device, an image comprising a target marker, the instructions which, when executed by the one or more processors, cause the one or more processors to further perform operations of:
capturing, in a nth time, an image containing only a marker Xn of the plurality of markers, and recognizing the marker Xn in the image to acquire a position and a pose of the marker Xn relative to the terminal device;
capturing, in a (n+1)th time, an image containing only a marker Xn+1 of the plurality of markers, and recognizing the marker Xn+1 in the image to acquire a position and a pose of the marker Xn+1 relative to the terminal device;
acquiring, through a visual-inertial odometer of the terminal device, six degrees of freedom (6DOF) of the terminal device in real time, the 6DOF comprising a position and a pose of the terminal device;
acquiring a position change and a pose change of the terminal device in the (n+1)th time relative to that of the terminal device in the nth time; and
acquiring a spatial position relation between the marker Xn and the marker Xn+1, based on the position change and the pose change of the terminal device, the position and the pose of the marker Xn relative to the terminal device, and the position and the pose of the marker Xn+1 relative to the terminal device;
acquiring the first spatial position relation between each of the plurality of markers, based on the spatial position relation between the marker Xn and the marker Xn+1.

14. The terminal device of claim 8, wherein, prior to the reacquiring, in response to a position updating instruction, the first spatial position relation between each of the plurality of markers and storing the reacquired first spatial position relation, the instructions which, when executed by the one or more processors, cause the one or more processors to further perform operations of:
capturing, through the terminal device, a plurality of images for the plurality of markers automatically during a user experiencing an augmented reality to detect whether a position of any one of the plurality of markers is changed; and
receiving, through the terminal device, the position updating instruction when a position change of any one of the plurality of markers is detected.

15. The terminal device of claim 8, wherein, prior to the reacquiring, in response to a position updating instruction, the first spatial position relation between each of the plurality of markers and storing the reacquired first spatial position relation, the instructions which, when executed by the one or more processors, cause the one or more processors to further perform operations of:
receiving, through the terminal device, the position updating instruction based on an operation of a user.

16. A non-transitory computer storage medium, having a computer program stored in, wherein a processor is arranged to execute the computer program to perform operations of:
acquiring a first spatial position relation between each of a plurality of markers, the plurality of markers being arranged at various positions of a real scene and spaced apart from each other, comprising:
capturing, in a nth time, an image containing only a marker Xn of the plurality of markers, and recognizing the marker Xn in the image to acquire a position and a pose of the marker Xn relative to a terminal device;
capturing, in a (n+1)th time, an image containing only a marker Xn+1 of the plurality of markers, and recognizing the marker Xn+1 in the image to acquire a position and a pose of the marker Xn+1 relative to the terminal device;
acquiring, through a visual-inertial odometer of the terminal device, six degrees of freedom (6DOF) of the terminal device in real time, the 6DOF comprising a position and a pose of the terminal device;
acquiring a position change and a pose change of the terminal device in the (n+1)th time relative to that of the terminal device in the nth time; and
acquiring a spatial position relation between the marker Xn and the marker Xn+1, based on the position change and the pose change of the terminal device, the position and the pose of the marker Xn relative to the terminal device, and the position and the pose of the marker Xn+1 relative to the terminal device;
capturing, through a camera of the terminal device, an image comprising a target marker, wherein the target marker is at least one marker of the plurality of markers;
acquiring a target spatial position of the target marker relative to the terminal device based on the captured image;
acquiring a second spatial position relation of a virtual object relative to the plurality of markers;
determining a display position of the virtual object based on the first spatial position relation, the second spatial position relation, and the target spatial position; and
displaying the virtual object based on the display position.

17. The non-transitory computer storage medium according to claim 16, wherein the second spatial position relation of the virtual object relative to the plurality of markers comprises at least one selected from the group consisting of:
a spatial position relation between the virtual object and a spatial region defined by the plurality of markers;
a spatial position relation between the virtual object and a central position of a region defined by the plurality of markers;
a spatial position relation between the virtual object and a predefined marker of the plurality of markers; and
a spatial position relation between the virtual object and the target marker.

18. The non-transitory computer storage medium of claim 16, wherein the second spatial position relation of the virtual object relative to the plurality of markers is a spatial position relation between the virtual object and a predefined marker of the plurality of markers;
wherein the determining a display position of the virtual object based on the first spatial position relation, the second spatial position relation, and the target spatial position comprises:
acquiring a central position of a region defined by the plurality of markers based on the first spatial position relation;
acquiring the predefined marker from the plurality of marker based on the central position, wherein a distance between the predefined marker and the central position is less than a distance between any other one of the plurality of markers and the central position; and
determining the display position of the virtual object based on the target spatial position, the second spatial position relation, and a spatial position relation of the predefined marker relative to the target marker.

19. The non-transitory computer storage medium of claim 16, wherein the processor is further arranged to execute the computer program to perform operations of:
reacquiring, in response to a position updating instruction, the first spatial position relation between each of the plurality of markers and storing the reacquired first spatial position relation, comprising:
capturing an image which contains a marker with a position change included in the plurality of markers and a marker without a position change included in the plurality of markers;
recognizing the captured image to acquire a spatial position of the marker with the position change relative to the terminal device and an identity of the marker with the position change;
acquiring a spatial position of the marker without the position change relative to the terminal device and an identity of the marker without the position change;
acquiring a spatial position relation between the marker with the position change and the marker without the position change, based on the spatial position of the marker with the position change relative to the terminal device and the spatial position of the marker without the position change relative to the terminal device, thereby acquiring an updated first spatial position relation; and
storing the updated first spatial position relation.

20. The non-transitory computer storage medium of claim 19, wherein prior to the reacquiring, in response to a position updating instruction, the first spatial position relation between each of the plurality of markers and storing the reacquired first spatial position relation, the processor is further arranged to execute the computer program to perform operations of:
capturing, through the terminal device, a plurality of images for the plurality of markers automatically during a user experiencing an augmented reality to detect whether a position of any one of the plurality of markers is changed; and
receiving, through the terminal device, the position updating instruction when a position change of any one of the plurality of markers is detected;
or
receiving, through the terminal device, the position updating instruction based on an operation of a user.

* * * * *